United States Patent [19]

Patton et al.

[11] 4,064,331

[45] Dec. 20, 1977

[54] METHOD FOR THE PREPARATION OF IRON ELECTRODES

[75] Inventors: Jesse T. Patton, Jeannette; Alois Langer, Pittsburgh, both of Pa.

[73] Assignee: Westinghouse Electric Corporation, Pittsburgh, Pa.

[21] Appl. No.: 657,910

[22] Filed: Feb. 13, 1976

Related U.S. Application Data

[63] Continuation of Ser. No. 451,247, March 14, 1974, abandoned.

[51] Int. Cl.$^2$ ............................................. H01M 4/52
[52] U.S. Cl. .................................. 429/221; 264/29.1; 264/29.5; 264/61; 264/63; 264/105; 264/111; 264/129; 429/232
[58] Field of Search ..................... 264/29.1, 59, 61, 63, 264/104, 105, 111, 122, 29.5, 129, 131; 429/221, 42, 217, 232

[56] References Cited

U.S. PATENT DOCUMENTS

| 3,255,283 | 6/1966 | Weidman | 264/63 |
| 3,347,668 | 10/1967 | Clark et al. | 264/105 |
| 3,413,152 | 11/1968 | Folkins et al. | 429/13 |
| 3,531,329 | 9/1970 | Selwitz | 429/42 |
| 3,573,122 | 3/1971 | Olstowski et al. | 264/105 |
| 3,625,765 | 12/1971 | Arrance et al. | 429/42 |
| 3,711,279 | 1/1973 | Hivert et al. | 264/63 |
| 3,819,413 | 6/1974 | Nippe et al. | 429/221 |
| 3,836,397 | 9/1974 | Hardman | 429/221 |
| 3,849,198 | 11/1974 | Seidel | 429/221 |

Primary Examiner—Jeffery R. Thurlow
Attorney, Agent, or Firm—D. P. Cillo

[57] ABSTRACT

A method for preparing iron electrodes is provided which includes mixing particulate iron such as iron powder, iron oxide or iron hydroxide with an organic moldable resin and, preferably, carbon black. The mixture is molded into the desired electrode configuration and the molded electrode is heated in an inert atmosphere to at least 950° C. to carbonize said resin. The electrode may be thereafter activated by use of sulfur compound or the like.

6 Claims, No Drawings

METHOD FOR THE PREPARATION OF IRON ELECTRODES

This is a continuation of application Ser. No. 451,247, filed Mar. 14, 1974, now abandoned.

FIELD OF THE INVENTION

The present invention relates to an iron electrode for use in high energy storage batteries, and, in particular, to a method for preparing iron electrodes utilizing a carbonizable molding resin.

BACKGROUND OF THE INVENTION

The use of iron electrodes in storage batteries, metal/air batteries or cells and the like is old and well known. For example, the nickel-iron-alkaline cell, or Edison cell, comprises a nickel oxide positive plate, an iron negative plate, and a potassium or lithium hydroxide electrolyte. The iron electrode of the commerical Edison cell typically consists of perforated tubes or plates of nickel containing iron oxide. The tubes are generally supported in a grid structure.

In recent years, however, substantial improvements have been made in the performance of iron electrodes by depositing activated iron oxide into small pockets or grids which are formed by sintered nickel fiber mats or in pockets formed by nickel-plated steel wool fibers. The performance obtained from iron electrodes fabricated in this manner represents a substantial improvement over commercially available iron electrodes as embodied in the Edison cell.

Notwithstanding the satisfactory performance obtained from iron electrodes fabricated with sintered nickel grids, they have a number of inherent disadvantages. One of the primary disadvantages is that they are relatively expensive. Not only are the nickel or nickel-plated sintered fiber mats expensive, but the processing required to load the iron oxide into the pockets formed within the mats is costly. Furthermore, the weight of the nickel fiber mat is sufficiently high to provide low weight coefficiencies for the electrode allowing only limited current drains.

Accordingly, it is an object of the present invention to provide a process for the preparation of iron electrodes in which performance characteristics of the iron electrode is at least as good as that of the fiber grid iron electrodes, but in which a substantial reduction in weight can be achieved. It is also an object of the invention to provide a process for the manufacture of iron electrodes which is substantially less expensive than conventional processing techniques.

SUMMARY OF THE INVENTION

The present invention provides an iron electrode for use in storage batteries, metal/air batteries and the like having a substantially reduced weight and performance characteristic at least as good as prior art iron electrodes. The present invention provides a method in which a mixture of iron oxide or iron hydroxide, carbon black, and an organic, preferably a phenolic, resinous carbonizable molding compound is pressed into the desired shape of the electrode. The molded structure is thereafter placed in an inert atmosphere, such as argon, and heated to a temperature of at least 950° C.

The heating cycle removes the oxygen and the hydrogen components of the phenolic molding resin to provide a porous structure which is both mechanically strong and of high electronic conductivity. The temperature is selected to carbonize the resinous molding compound into a porous matrix in which matrix the iron oxide is encapsulated. While a temperature of about 500° C. is adequate to carbonize the organic molding resins, it is necessary to heat the molded structure to at least 950° C. in order to obtain a suitable electrode. The porous structure is thereafter activated by use of sulfur compounds such as by soaking the electrode in $H_2S$-saturated water.

DESCRIPTION OF THE INVENTION

Preferably, the electrode of the present invention is prepared by molding a mixture of iron oxide, such as Merramec ® $Fe_3O_4$, a carbon black such as Shawinigan ® and a phenolic molding powder such as Durite ® (Borden Company). While an iron electrode of the present invention can be prepared without the utilization of carbon black, it is not preferred. It has been found that the utilization of carbon black, preferably a highly voluminous carbon black, inhibits foaming of the phenolic resin during the pyrolytic cycle. Additionally, it has been found that the carbon black provides a favorable porosity to the electrode for the introduction of electrolytes in the battery systems in which it is incorporated. Also, during the pyrolytic carbonizing cycle the iron oxide particles have been found to shrink and the carbon black maintains the conductivity between the carbon matrix structure and the iron oxide. Without the incorporation of carbon black, the conductivity of the final electrode is reduced.

While the electrode can be made in the charged state by utilizing an iron powder, it is preferable to prepare the electrode in the discharge state with iron oxide or iron hydroxide. The advantages obtained by the utilization of iron powder for preparation in the charged state are not sufficiently great in relation to problems of compatability as well as problems during carbonization to recommend their usage. Preferably, the iron oxide is ground to a particulate size of about 200 to 300 mesh.

As respects the organic resin, any moldable organic carbonizable resin is suitable for use in the present invention. The resin should be moldable at a temperature of not greatly in excess of 200° C. and, preferably, 100° C. For the purposes of the present invention, it has been found that phenolic resins are particularly well suited. One such resin is Durite ® manufactured by the Borden Company.

Preferably, the ratio of the iron oxide, carbon black and the moldable resin by weight is 8:1:2. This ratio has been found to provide extremely good performance characteristics including well-defined discharge plateaus and high weight efficiencies. While a 4:1 weight ratio of iron oxide to resin is preferred, other ratios that vary from that preferred amount have been found suitable, such as a 2:1 ratio of iron oxide to resin. A 1:1 ratio is not preferred, however, because the electrode structure becomes too dense which reduces the desired conductivity. Where the iron oxide ratio is increased over the preferred amount, such as an 8:1 ratio, the structure becomes undesirably brittle. With respect to the amount of carbon black present, no advantage is attendant to increasing the amounts above that preferred.

In the manufacture of large iron electrodes, it may be desirable to utilize either carbon filaments or nickel fibers to increase the strength of the electrodes. Alternatively, a metallic screen can be incorporated into the paste-like mixture prior to molding. While the incorporation of the fibers or filaments increases the structural strength of the fabricated electrode, they also increase the weight of the electrode without providing a corresponding increase in performance. Thus, care should be taken in effectively utilizing any type of fiber reinforcement.

Illustrative of the invention was an iron electrode prepared by mixing iron oxide (Merramec ® $Fe_3O_4$) with Shawinigan ® carbon black and a Durite ® brand phenolic resin in the preferred weight ratio of 8:1:2. This mixture was then pressed at 90° F. and 1000 lbs.-in.$^{-2}$ for several minutes to prepare an electrode 1 inch ·0.5 inch ·0.1 inch in size. The electrode was roasted in an argon atmosphere by slowly increasing the temperature (4°/min.) to 950° C. The carbonized electrode weighed 1.78 g.

The resulting porous electrode was mechanically strong and had a high electronic conductivity. The electrode was activated by soaking it in an $H_2S$-saturated water solution. The activated electrode was tested in an alkaline storage battery against a nickel hydroxide positive electrode.

The electrode was charged at 0.5A for 3 hrs. The resulting discharge curve was found to have well-defined iron plateaus of approximately equal length. The weight capacity was approximately 0.6 Ah/g for the total structure, which is a higher capacity than the improved electrodes with the fiber grid. The capacity was found by a drain through a 10 ohm resistance with plateau voltages against the electrode of 1.2 v on the first and 0.95 v on the second.

The electrode was automatically cycled approximately 30 times without evidence of material deterioration or a lack of reproducibility.

While a presently preferred embodiment of the invention has been described in particularity, it may be otherwise embodied within the scope of the appended claims.

What is claimed is:

1. A method for the preparation of an iron electrode comprising mixing a particulate iron selected from the group consisting of an iron powder, an iron oxide and an iron hydroxide with an organic moldable resin, carbonizable at the temperatures of at least 950° C., wherein the weight ratio of particulate iron to resin is from about 1:1 to about 8:1, and a small effective amount of a carbon black; molding said mixture into an electrode shape, and slowly heating said molded shape to at least 950° C. in an inert atmosphere, to carbonize said organic resin into a porous matrix and form a mechanically strong, porous electrode; wherein the amount of carbon black present is effective to maintain conductivity between the matrix and the iron particles after carbonization.

2. A method as set forth in claim 1 wherein the ratio by weight of said particulate iron to carbon black to resin is about 8:1:2.

3. A method as set forth in claim 1 wherein said resin is a phenolic resin, the iron has a particle size of between about 200 mesh to 300 mesh, the electrode is molded at a temperature of about 100° C. and at a pressure of about 1000 psi and then heated at a temperature rate of about 4° C./min. to at least 950° C in an argon atmosphere and where, as a last step, the electrode is activated by soaking it in a sulfur compound solution.

4. An iron electrode as prepared in the method as set forth in claim 1.

5. An iron electrode as prepared in the method as set forth in claim 2.

6. An iron electrode prepared in the method as set forth in claim 3.

* * * * *